May 27, 1958  R. M. ADKINS  2,836,775
BUS BAR RELAYS

Filed Feb. 29, 1956  3 Sheets-Sheet 1

INVENTOR.
Russell M. Adkins.
BY W. L. Stout
HIS ATTORNEY

May 27, 1958 R. M. ADKINS 2,836,775
BUS BAR RELAYS
Filed Feb. 29, 1956 3 Sheets-Sheet 2

INVENTOR.
Russell M. Adkins.
BY
W. L. Stout
HIS ATTORNEY

May 27, 1958 R. M. ADKINS 2,836,775
BUS BAR RELAYS

Filed Feb. 29, 1956 3 Sheets-Sheet 3

INVENTOR.
Russell M. Adkins.
BY W. L. Stout
HIS ATTORNEY

United States Patent Office 2,836,775
Patented May 27, 1958

2,836,775
BUS BAR RELAYS

Russell M. Adkins, Wilkinsburg, Pa., assignor to Westinghouse Air Brake Company, Wilmerding, Pa., a corporation of Pennsylvania Application February 29, 1956, Serial No. 568,520

14 Claims. (Cl. 317—172)

My invention relates to electrical relays, and particularly to a bus bar relay operable by the magnetic flux created by the direct current flowing in a bus bar.

Bus bar relays provide a means for effecting a control or controls in response to the magnetic field established by the direct current flowing in the associated bus bar. In the opration and control of diesel locomotives, bus bar relays have been used to open and close the circuits of the driving motors to provide a high torque or high speed operation of the motors in accordance with the magnitude of the current flowing through the bus bars connecting the generator to the motors. It has been suggested that the transition from one form of motor operation to another form of motor operation may be accomplished more smoothly when the switching is done in accordance with the power delivered by the generators of the locomotive. A bus bar relay operable in accordance with the power consumption requires means for obtaining an operating flux in accordance with the current flowing in the circuit and an operating flux in accordance with the voltage impressed on the circuit, the two fluxes combining either additively or subtractively to operate the bus bar relay in accordance with the power demand.

It is therefore an object of my invention to provide a self-contained relay adapted to be secured to a bus bar of an electrical circuit, the magnetizable core of the relay being arranged to provide a low reluctance path for the magnetic field set up by the current flowing through the bus bar, the magnetizable core having operating windings thereon for developing a magnetic field or fields in accordance with one or more energy sources.

It is a further object of this invention to provide a bus bar relay of the character indicated wherein the operating windings may be connected either in series, in multiple or individually to one or more sources of energy, the magnetic flux or fluxes developed by the windings either aiding or opposing the magnetic flux resulting from the current flowing through the bus bar, thereby varying the bus bar current levels at which the relay may operate.

Still another object of my invention is to provide a source of polarizing flux for the magnetic circuit of a bus bar relay of the character indicated, whereby armature pickup is prevented when reverse energy several times greater than normal pickup level energy is applied to the operating windings of the relay or to the bus bar.

These and other objects of my invention I accomplish by providing a nonmagnetic mounting plate securable to a bus bar and on which the operating mechanism of my novel relay is mounted. The operating mechanism comprises two magnetizable core members secured to and extending through the mounting plate, the core members being suitably spaced apart to permit the insertion of a bus bar through a recess provided in the mounting plate and between the two core members. Secured to the dependent ends of the core members are operating or biasing windings which may be connected to one or more energy sources, the lower ends of the core members being interconnected by a magnetizable backstrap.

The upper ends of the core members are provided with two magnetizable J-shaped members, the J-shaped members being so secured as to provide an air gap between the core members and the ends of their respective J-shaped members. The J-shaped members are preferably provided with permanent magnet portions of predetermined polarities, the permanent magnet portions being provided with magnetizable shunts or keepers. A magnetizable armature pivoted intermediate its ends completes the magnetic circuit of the relay, the ends of the armature extending into the air gaps between the core members and their respective J-shaped members.

The operating or biasing windings of the relays are so arranged in the embodiment of the invention hereinafter described that the winding on one core member and a portion of a winding on the other core members are series-connected in aiding relation to one energy source, the flux developed being in opposition to the flux developed by the direct current in the bus bar. The remaining portion of the one winding may be connected to a second energy source, the flux developed by the winding portion either aiding or opposing the flux of the series connecting windings. It is thus possible to operate the relay at several different pickup levels of bus bar current, as, for example, a predetermined value of the current flowing through the bus bar only, or a bus bar current level at which the magnetizing flux is of sufficient magnitude to overcome the opposing flux due to the energization of the operating windings. Energization of the winding portion on the one core member will produce still a third operating flux whereby the pickup level may be further varied. The basic pickup level of the relay by the flux of the bus bar current may thus be varied by energizing one or more of the operating windings, the bus current pickup level being determined by the amount and polarity of the energy applied to the biasing windings. If the winding energy produces flux in the same direction as the flux due to the bus bar current, the bus pickup current level of operation will be decreased, and if the flux due to the winding energy is in opposition, the bus pickup current level of operation will be increased.

In order to increase the bus pickup current level of the relay to approximately 2000 to 3000 amperes, it is necessary to prevent pickup of the relay when opposing energy is applied to the operating windings. The J-shaped permanent magnet members secured to the upper ends of the core members provide a polarizing flux to bias the relay armature, the magnetic shunt for the permanent magnet members diverting the opposing flux developed by the operating windings to prevent pickup of the armature. The value of the bus bar current at which the relay will pick up may thus be increased to a value in the order of about 3000 amperes.

I shall describe two forms of a relay embodying my invention, and shall then point out the novel features thereof in claims.

In the accompanying drawings:

Fig. 7 is a front elevational view of a second embodiment of my novel relay, while

Similar reference characters designate similar parts throughout the several views.

Figure 1:
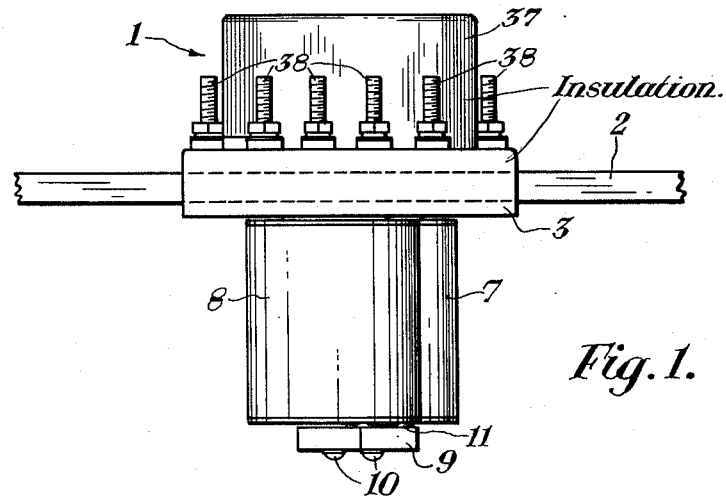
Fig. 1 is a side elevational view of a relay embodying my invention mounted on a bus bar.
Figure 2:
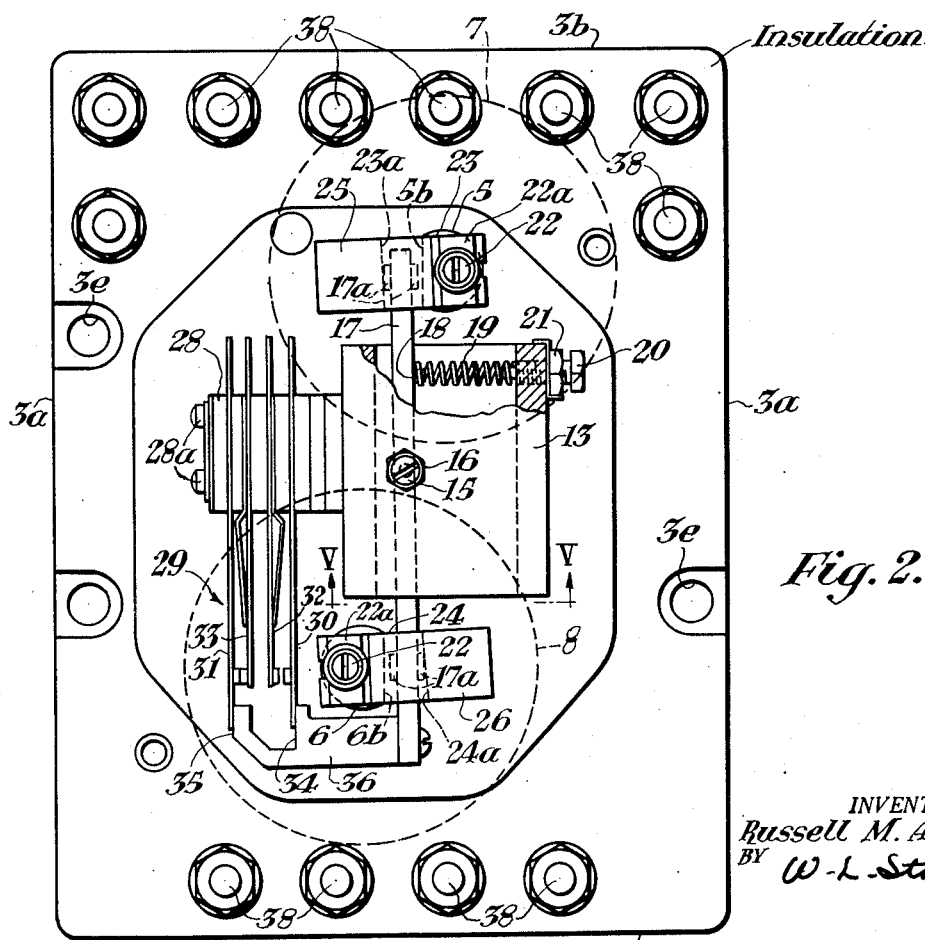
Fig. 2 is a top plan view of my novel relay with the cover removed and portions of the relay structure broken away to show certain details of construction to better advantage.
Figure 3:
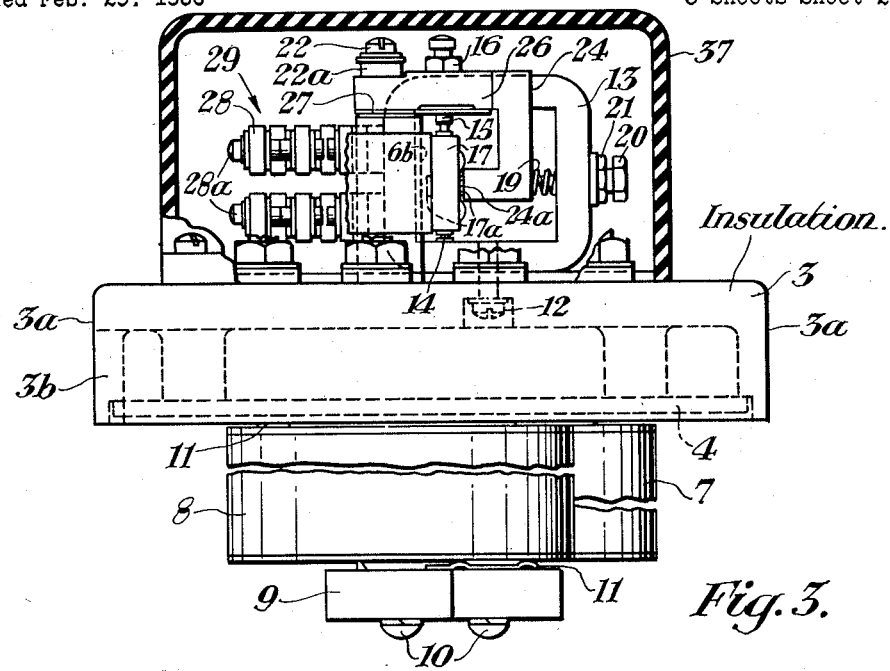
Fig. 3 is an end view of the bus bar relay with portions of the cover and relay structure broken away.
Figure 4:
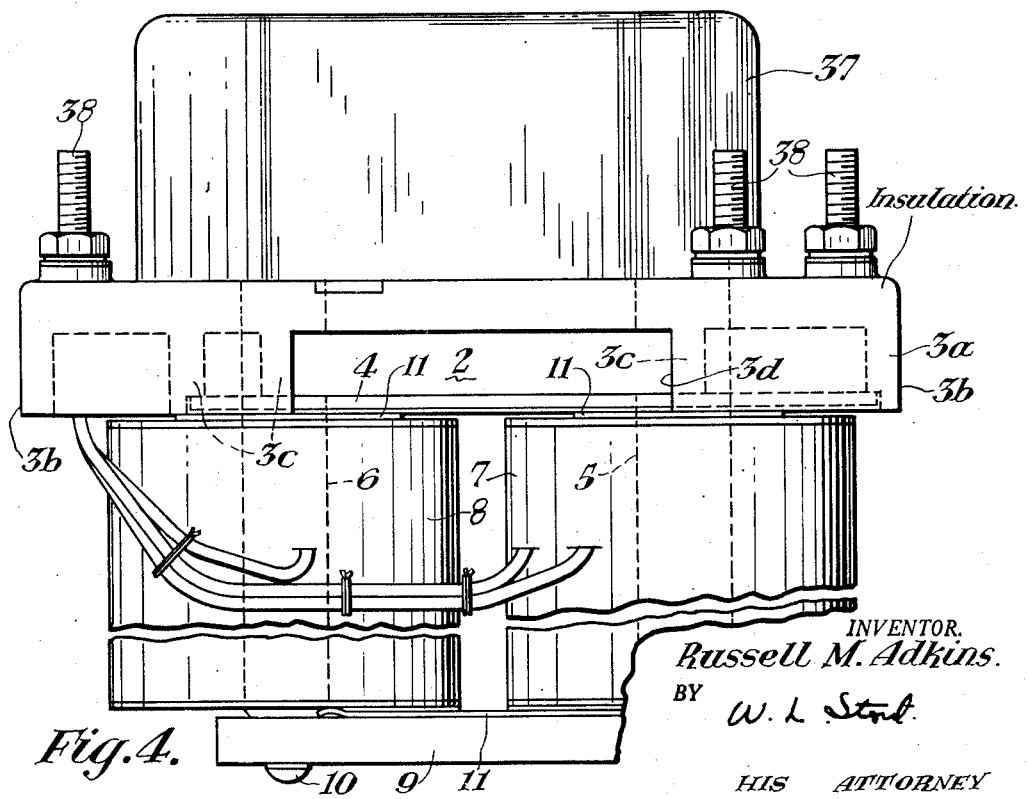
Fig. 4 is a front elevational view of the novel bus bar relay.

Referring now in detail to the drawings, the reference numeral 1 designates a bus bar relay embodying my invention, the bus bar relay illustrated in Fig. 1 being secured to a bus bar 2 in a manner to be described. The bus bar relay 1 comprises a top plate 3 made of insulation material to which the relay operating mechanism is secured. The top plate 3 is preferably molded in the form of an inverted rectangular container having dependent sides 3a and dependent ends 3b. The container portion of the top plate is compartmentalized by two transversely disposed, dependent ribs 3c. The sides 3a of the top plate are each formed with a notch 3d (Fig. 4), the edges of the notches coinciding with the opposing faces of the ribs 3c to form a channel or passageway for receiving the bus bar 2. A bottom cover 4 made of insulation material is held in abutment against the lower ends of the ribs 3c in a manner to be described.

Molded in or otherwise secured to the top plate 3 are two spaced magnetizable core members 5 and 6, the lower ends of the core members passing through suitable openings (not shown) in the bottom cover 4. The core members 5 and 6 are preferably molded in the top plate 3 so that they pass through the dependent ribs 3c, the core members being notched as at 5a and 6a (Fig. 6) so that the surfaces of the notched portions are flush with the opposing surfaces of the dependent ribs. Mounted on each of the dependent ends of the core members 5 and 6 are biasing coils 7 and 8, respectively, which will hereinafter be more fully described. The biasing coils 7 and 8 are held on the core members by a backstrap 9 of magnetizable material secured to the ends of core members by screws 10. Interposed between the upper ends of the coils and the bottom cover 4 and between the lower ends of the coils and the backstrap 9 are bowed spring members or washers 11 which are under tension to hold the coils securely on the core members and to hold the bottom cover 4 against the dependent ribs 3c of the top plate 3.

Figure 5:
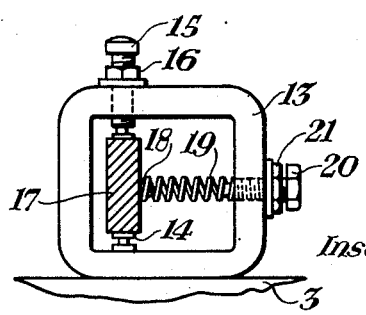
Fig. 5 is a fragmentary sectional view taken along the line V—V of Fig. 2.

Secured to the top surface of the top plate 3, as by screws 12, is a tubular member 13 of a nonmagnetic material such as brass (Fig. 5). The tubular member 13 is provided with a fixed pivot 14 secured to the bottom wall thereof and an adjustable pivot 15 threaded through the top wall, the adjustable pivot being securable by a nut 16. Mounted on the pivots 14 and 15 intermediate its ends is a magnetizable armature 17 adapted to be oscillated in a horizontal plane. Secured to the armature approximately midway between its pivot point and one end is a spring retainer 18. Abutting the armature and disposed about the spring retainer 18 is a coil compression spring 19, the other end of the spring abutting a spring retainer 20 threaded through a side wall of the tubular member 13. The bias of the spring 19 may be adjusted by the spring retainer 20, the bias adjustment being secured by a nut 21 threaded on the spring retainer.

Figure 8:
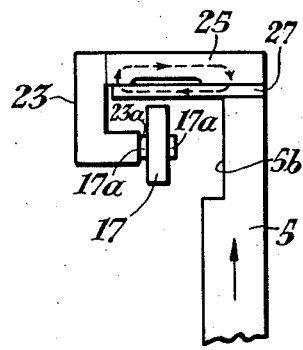
Fig. 8 is an enlarged elevational view of one set of relay pole pieces.

Secured to the upper ends of the core members 5 and 6 as by screws 22 and locking members 22a are J-shaped magnetizable members 23 and 24, respectively. Each of the J-shaped members 23 and 24 is made of a magnetizable material having a permanent magnet portion 25 and 26, respectively. For purposes hereinafter appearing, the permanent magnet portions are undercut as at 25a and 26a, respectively, to form pole faces, the pole faces of each magnet being interconnected by a magnetic shunt or keeper 27 (Fig 8). The ends of the armature 17 are adapted to be oscillated in the air gaps provided between the pole faces 5b and 23a on the core member 5 and member 23, respectively, and between the pole faces 6b and 24a on the core member 6 and member 24, respectively. Nonmagnetic core pins 17a are provided for the armature 17 to prevent sticking of the armature, the pins striking the pole faces upon oscillation of the armature.

Secured to a side wall of the tubular member 13 by screws 28a is a laminated stack 28 of insulating material forming a support for a contact assembly designated generally by the reference numeral 29. As herein illustrated by way of example, the contact assembly comprises two pairs of elongated spring fingers 30 and 31 and two pairs of contact fingers 32 and 33 which are shorter in length than the fingers 30 and 31. The elongated spring fingers 30 and 31 are pretensioned so that the ends of the spring fingers engage surfaces 34 and 35, respectively, on a contact actuating member 36 of insulating material secured to a face of the armature 17. The spring and contact fingers are so arranged and pretensioned that the fingers 30 and 32 form back contacts for the relay illustrated, while fingers 31 and 33 form front contacts for the relay. It will be understood that any combination of back and front contacts may form the contact assembly 29, the contact actuating member opening and closing the contacts provided in accordance with the energization and deenergization of the relay.

The top plate 3 forms the entire support for the relay mechanism described, the relay being readily mounted on the bus bar 2 and secured thereto by bolts (not shown) passing through suitable bolt openings 3e provided in the top plate. The pole members, armature and contacts of the relay are protected against mishap and ambient conditions by a suitable cover 37 secured to the top plate 3. Circuit connections for the operating coils and the relay contacts are made through the plurality of terminal posts 38 molded in the top plate, the terminal posts being external of the relay cover 37.

Figure 7:
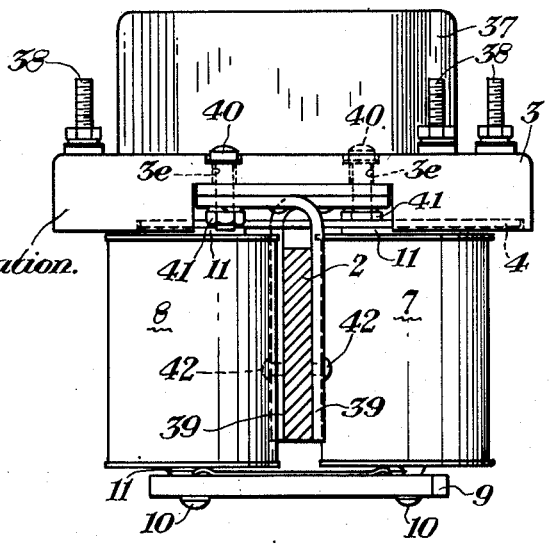

In Fig. 7 of the drawings I have illustrated a second embodiment of my invention, the relay 1 in this instance being secured to a horizontally disposed bus bar, the flat sides of the bus bar being vertically disposed and passing between the operating coils 7 and 8. The relay 1 in this embodiment is slightly modified to include two substantially L-shaped brackets 39 preferably of brass, the brackets being secured to the underside of the top plate 3 by bolts 40 and nuts 41, the bolts passing through the mounting holes 3e of the top plate. The bus bar 2 passes between the inner faces of the two brackets, the relay being secured to the bus bar by bolts 42.

Figure 6:
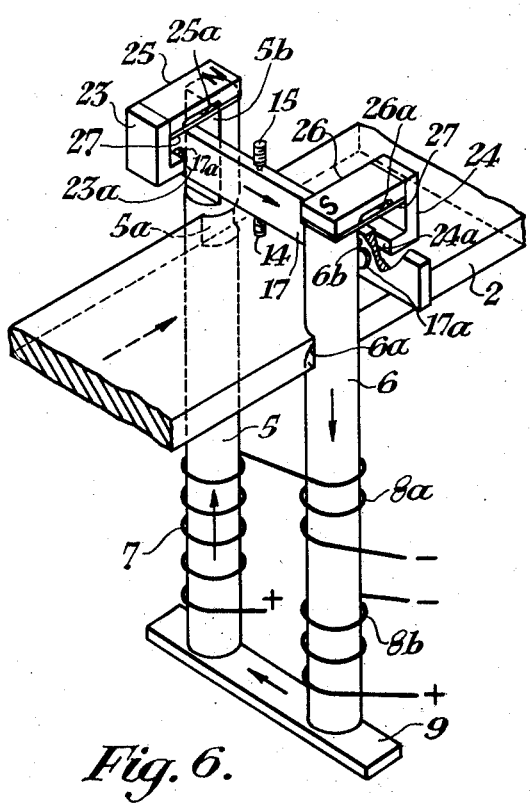
Fig. 6 is a schematic view of the magnetic structure of the relay.

Referring now in detail to Figs. 6 and 8 of the drawings, the end of the permanent magnet 25 over the core member 5 has been arbitrarily designated a north pole while the end of the permanent magnet 26 over the core member 6 has been designated a south pole. The polarizing fluxes due to the permanent magnets thread the magnetic shunts or keepers abutting the pole faces provided on the magnets, the polarizing fluxes saturating the keepers. In Fig. 8, the direction of the polarizing flux due to the permanent magnet 25 is indicated by a dash line loop, the arrow on the core member 5 indicating the polarity of the operating flux due to bus bar current. A small portion of the polarizing flux of each permanent magnet also threads the armature 17, the path being traceable from the magnet 26 through the member 24 to the pole face 24a of the magnetizable member 24 to the armature 17, through the armature 17 to the pole face 23a and through the member 23 to the magnet 25, then downwardly through core member 5 through backstrap 9 and upwardly through core member 6.

Assuming now a current in the bus bar in the direction indicated by the dashed line arrow, the operating flux due to the bus bar current will thread the magnetic circuit in the direction of the arrows placed on the core members, backstrap and armature; the operating flux threading downwardly through core member 6 and upwardly through core member 5. The operating flux threading upwardly through the core member 5 forms a north pole at the upper end of the core member which is of the same polarity as the adjacent end of the permanent magnet 25 (Fig. 8). The permanent magnetic material forming the magnet provides a relatively high reluctance path for the operating flux. The keeper 27 of the magnetizable member 23 being saturated by the polarizing flux of the magnet 25 also forms a high reluctance path. The operating flux due to the bus bar current takes the path of relatively lower reluctance across the air gap between the pole face 5b and the armature 17 and threads the armature in the direction of the arrow. Due to the relatively high reluctance paths offered by the permanent magnet 26 and its keeper 27, the operating flux passes across the air gap between the armature 17 and pole face 6b and downwardly through core member 6 and through the backstrap to the core member 5. With a sufficient current level, the armature is moved against the bias of spring 19 to its picked-up position wherein the core pins 17a abut the pole faces 5b and 6b, the movement of the armature opening the back contacts 31–33 and closing the front contacts 30–32.

Under the operating conditions thus far described, when the current through the bus bar 2 is cut off, the magnetizable members become deenergized and the spring 19 returns the armature to its normal or dropped position against the pole faces 23a and 24a.

The arrangement of the magnetizable members is such that in the event a reverse current flows through the bus bar creating an operating flux in the magnetic circuit of a polarity opposite to that indicated in the drawings, the relay herein described will not be picked up even though the reverse energy is twenty times as great as the normal energy pickup level.

If we assume a bus bar current of opposite polarity, the operating flux would thread through the magnetic circuit of the relay in a direction opposite to that indicated. The upper end of the core member 6 may then be considered a north pole. The operating flux due to the reverse current will now thread through the keeper 27 of the permanent magnet 26 in opposition to the polarizing flux saturating the keeper, but not through the permanent magnet section 26 since this portion of the magnetizable member remains a path of relatively high reluctance. The operating flux passes from the keeper into the magnetizable member 24, through the magnetizable member to the pole face 24a thereof, across the short air gap to the armature 17. The reverse operating flux threads through the armature, passes over the short air gap to pole face 23a into the magnetizable member 23. The operating flux then threads through the keeper 27 of magnet 25 in opposition to the polarizing flux to the top of the core member 5, then down through the core member 5, through the backstrap 9 and upwardly through the core member 6. The armature 17 is thus held against the pole faces 23a and 24a in its inoperative position, the bus bar current of reverse polarity aiding the permanent magnets 25 and 26 in holding the armature.

An increase in the level of the reverse bus bar current will not pick up the armature 17 until a point is reached where the reverse operating flux created by the bus bar current saturates the keepers 27 in a direction opposite to that in which the keepers were saturated by the polarizing fluxes created by the permanent magnets 25 and 26. At that level of reverse bus bar current, the keepers 27 again form paths of relatively high reluctance, the reverse operating flux at this point passing out through the pole face 6b, across the air gap and into armature 17. The reverse operating flux then threads the armature 17 and passes over the air gap into the pole face 5b, threads downwardly through the core member 5 and through the backstrap 9 to the core member 6 to pick up the armature. The level of reverse energy at which the armature picks up will be at least twenty times the normal pickup level of energy due to the shunting action of the magnetizable members.

The normal level of bus bar current at which the herein described relay will pick up depends upon the design of the magnetizable members forming the magnetic circuit, the lengths of the air gaps between the pole pieces and armature ends, the lengths of the armature core pins, etc. The bus bar current pickup level of a relay embodying my invention may be widely varied, pickup levels of bus bar current from zero to 3000 amperes or more being possible. The bus bar current level may be increased or decreased by the biasing flux developed upon energization of the biasing windings 7 and/or 8. In Fig. 6, the biasing winding 7 and a portion 8a of biasing winding 8 are series-connected and wound about the core members so that the biasing fluxes developed by the windings are in aiding relation. The polarity of the energizing current flowing through the windings 7 and 8a will determine the polarity of the flux. Assuming the current polarity to be as indicated, the biasing flux developed by the winding 7 will thread downwardly in the core member 5 to the backstrap while the biasing flux due to the energization of the winding 8a will thread upwardly in the core member 6. Since the polarity of the biasing flux under the assumed current polarities is opposite to the operating flux created by the bus bar current, the level of the bus bar current must necessarily be increased to a point where the resultant flux will operate the relay in the manner described. With energy applied to the biasing windings 7 and 8a of opposite polarity, the biasing flux will have the same polarity as the operating flux. The bus bar current level at which the relay will pick up is therefore decreased.

A further variation in the bus bar current pickup level of the relay may be obtained by energization of the biasing winding 8b. In Fig. 6, the winding 8b is wound on core member 6 in the same direction as the winding 8a. With current of a polarity as indicated in the drawing, the biasing flux developed by the winding 8b will thread downwardly through the core member 6, the polarity of the biasing flux being the same as the operating flux but opposite to the biasing flux created by the windings 7 and 8a.

Considering the operation of the relay in response to the biasing flux created by the windings alone, the relay will be operated in the manner described when the biasing flux is of the same polarity and level as the operating flux created by the bus bar current. With no bus bar current flowing it is therefore possible to pick up the relay provided the biasing flux is of the proper polarity. With a biasing flux of reverse polarity and no bus bar current flowing, the arrangement of the magnetized members and associated permanent magnet sections will prevent relay operation in the manner herein described in connection with a bus bar current of reverse polarity.

A bus bar relay embodying my invention may thus be used in the control of various apparatus in response to one or more variable conditions. In general, there are three methods of operation for the relay described. The operation of the relay may be effected one way by having a fixed level of current flowing through the bus bar and varying the voltage applied to the biasing windings. One of the biasing windings may also have a fixed biasing voltage applied intermittently thereto to provide a two-level operation. In the second method of operating the relay described, the operation of the relay may be effected by applying a fixed biasing voltage to one or more of the biasing windings and varying the current flow in the bus bar. In this case, two-level operation may again be effected by having a fixed biasing voltage applied intermittently to one of the biasing windings. In the third method of operation, both the bus bar current and the voltage applied to the biasing windings are allowed to vary until the combination of values provides a predetermined power rating at which pickup or dropout of the relay occurs. The relay is thus ideally suited for controlling a generator or a motor on a power basis, the current and voltage factors of such a circuit being integrated by the relay to provide the necessary operational control.

The relay herein described is further characterized by its very high percentage of dropout to pickup values at high current levels of operation. For example, a relay of the character described may be adjusted to pick up with a bus bar current level of 750 amperes and have a drop-out bus bar level of 525 amperes; a difference of 225 amperes, the drop-out level being approximately 70% of the pickup level. However, when this relay is operated with a biasing winding voltage to produce a bus bar pickup level of 2200 amperes, the drop-out level is approximately 1975 amperes, the 225 ampere differential being maintained for a drop-out level of approximately 90% of the pickup level.

A relay embodying my invention is further characterized by its sturdy and compact nature, the structure being such that the effects of vibrations in service are materially reduced due to the centrally pivoted armature and balanced mechanical forces. Such a relay may be mounted either horizontally as illustrated or vertically without affecting its initial calibration or its operation. The relay being self-contained is readily installed or removed should replacement be necessary, most adjustments for the relay being readily made by simply removing the cover enclosing the movable parts.

Although I have herein shown and described but two forms of a bus bar relay embodying my invention, it is understood that various changes and modifications may be made therein within the scope of the appended claims without departing from the spirit and scope of my invention.

Having thus described my invention, what I claim is:

1. In an electrical relay operable in response to current flowing in an electrical conductor, the combination comprising, a magnetic circuit forming a substantially closed loop transversely about a single cross section of said conductor and including a magnetizable armature movable from a first extreme position to a second extreme position by the operating flux of a first polarity created in the circuit by a current of a predetermined magnitude flowing through the conductor, means including biasing windings for said magnetic circuit to provide a biasing flux in the circuit to combine with the operating flux, the resultant flux moving said armature to its second extreme position at a conductor current magnitude other than the predetermined magnitude; and polarizing flux means for said magnetic circuit preventing said armature from being moved from its first extreme position when the polarity of the resultant flux is the opposite of said first polarity.

2. In an electrical relay operable in response to a current flowing in a bus bar conductor, the combination comprising, a magnetic circuit forming a substantially closed loop about said conductor, including a magnetizable armature; means positioning said armature to a first extreme position, said armature being movable from its first extreme position to a second extreme position by the operating flux of a first polarity created in the magnetic circuit by a current of predetermined magnitude flowing through the conductor, means including biasing windings for said magnetic circuit to create a biasing flux in the circuit to combine with the operating flux, the resultant flux moving said armature to its second extreme position at a conductor current magnitude other than the predetermined magnitude; and permanent magnet means to provide a polarizing flux in said circuit to prevent said armature from being moved from its first extreme position when the polarity of the resultant flux is the opposite of said first polarity.

3. In an electrical relay operable in response to a current flowing in an electrical conductor, the combination comprising a magnetic circuit forming a substantially closed loop transversely about a single cross section of said conductor and including a magnetizable armature; means biasing said armature to a first extreme position, said armature being movable from its first extreme position to a second extreme position by the operating flux of a first polarity created in the magnetic circuit by a current of predetermined magnitude flowing through the conductor, biasing windings for said magnetic circuit for connection to one or more energy sources to create a biasing flux in said circuit to combine with the operating flux, the resultant flux in the circuit moving said armature to its second extreme position at a conductor current magnitude other than the predetermined magnitude, and permanent magnet means to provide a polarizing flux in said circuit to prevent said armature from being moved from its first extreme position when the polarity of the resultant flux is the opposite of said first polarity.

4. In an electrical relay operable in response to a current flowing in a bus bar conductor, the combination comprising a magnetic circuit forming a substantially closed loop about the conductor to provide a low reluctance path for the operating flux created by a current flowing through the conductor, said circuit including a magnetizable armature movable between an inoperative position and an operative position, spring means for biasing said armature to its inoperative position, biasing windings for said magnetic circuit for connection to one or more energy sources to provide a biasing flux in said circuit, and means for providing a polarizing flux in said circuit, said armature being moved to its operative position when the flux density resulting from the operating and biasing fluxes in the circuit is of a predetermined magnitude and polarity, said polarizing flux preventing the movement of said armature from its inoperative position when the flux density is less than the predetermined magnitude and when the polarity of the polarizing flux is of opposite polarity.

5. In an electrical relay operable in response to a current flowing through an electrical conductor, the combination comprising, a magnetic circuit including two magnetizable core members, biasing windings on said core members to provide a biasing flux, a magnetizable backstrap interconnecting the one ends of the core members, pole faces on the other ends of the core members, magnetized members secured to the other ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members; the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet sections being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

6. In an electrical relay operable in response to a current flowing through an electrical conductor, the combination comprising, a magnetic circuit including two spaced magnetizable core members, biasing windings on said core members connectable to one or more energy sources to provide a biasing flux, a magnetizable backstrap interconnecting the one ends of the core members, pole faces on the other ends of the core members, magnetized members secured to the other ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members; the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet section being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

7. In an electrical relay operable in response to a current flowing through an electrical conductor, the combination comprising, a supporting plate of insulating material formed with a recess for insertion of the electrical conductor, a magnetic circuit including two spaced magnetizable core members secured to the supporting plate, biasing windings on said core members connectable to one or more energy sources to provide a biasing flux, a magnetizable backstrap interconnecting the one ends of the core members, pole faces on the other ends of the core members, magnetized members secured to the other ends of said core members having portions spaced from said core members pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members; the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet section being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

8. In an electrical relay operable in response to a current flowing through an electrical conductor, the combination comprising, a supporting plate of insulating material formed with a recess for insertion of the electrical conductor, a magnetic circuit including two spaced magnetizable core members secured to and through the supporting plate, biasing windings on the dependent ends of said core members to provide a biasing flux in said circuit when energized, a magnetizable backstrap interconnecting the dependent ends of the core members, pole faces on the upper ends of the core members, magnetized members secured to the upper ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members, the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet sections being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

9. In an electrical relay operable in response to a current flowing through an electrical conductor, the combination comprising, a supporting plate of insulating material formed with a recess for insertion of the electrical conductor, a magnetic circuit including two spaced magnetizable core members secured to and through the supporting plate, biasing windings on the dependent ends of said core members connectable to one or more energy sources to provide a biasing flux, a magnetizable backstrap interconnecting the dependent ends of the core members, pole faces on the upper ends of the core members, magnetized members secured to the upper ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; a nonmagnetic support secured to said plate, and a magnetizable armature pivoted intermediate its ends on said support, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members, the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet sections being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

10. In an electrical relay operable in response to a current flowing through an electrical conductor, the combination comprising, a supporting plate of insulating material, a magnetic circuit including two spaced magnetizable core members secured to and through the supporting plate, biasing windings on the dependent ends of said core members connectable to one or more energy sources to provide a biasing flux, said electrical conductor passing between the windings on the dependent core member ends, a magnetizable backstrap interconnecting the dependent ends of the core members, pole faces on the upper ends of the core members, magnetized members secured to the upper ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members, the operating flux of a first polarity created by a conductor current of predetermined magnitude moving said armature from its first position to a second extreme position against the core member pole faces, the biasing flux of the windings combining in the magnetic circuit with the operating flux to move said armature to its second position at a conductor current magnitude other than the predetermined magnitude, the polarities of the magnet sections being such that the saturated keepers form a relatively high reluctance path to flux of the first polarity; the saturated keepers forming a relatively low reluctance path to flux of opposite polarity, the flux of opposite polarity holding said armature in its first position against the magnetized member pole faces.

11. In an electrical relay operable in response to a current flowing through an electrical conductor, the combination comprising, a magnetic circuit including two magnetizable core members, biasing windings on said core members to provide a biasing flux, a magnetizable backstrap interconnecting the one ends of the core members, pole faces on the other ends of the core members, magnetized members secured to the other ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members; said armature being moved from its first position to a second position against the core member pole faces when the resultant flux density of the magnetic circuit due to the combined fluxes created by the currents flowing through the bus bar and the biasing windings is of a predetermined level and polarity, the polarities of the magnet sections being such that the saturated keepers form a relatively high reluctance path to flux of the predetermined polarity; the saturated keepers forming a relatively low reluctance path to flux having a polarity opposite to the predetermined polarity, the flux of opposite polarity holding said armature in its first position against the magnetized member pole faces.

12. In an electrical relay operable in response to a current flowing through an electrical conductor, the combination comprising, a magnetic circuit including two spaced magnetizable core members, biasing windings on said core members connectable to one or more energy sources to provide a biasing flux, a magnetizable backstrap interconnecting the one ends of the core members, pole faces on the other ends of the core members, magnetized members secured to the other ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members; said armature being moved from its first position to a second position against the core member pole faces when the resultant flux density of the magnetic circuit due to the combined fluxes created by the currents flowing through the bus bar and the biasing windings is of a predetermined level and polarity, the polarities of the magnet sections being such that the saturated keepers form a relatively high reluctance path to flux of the predetermined polarity; the saturated keepers forming a relatively low reluctance path to flux having a polarity opposite to the predetermined polarity, the flux of opposite polarity holding said armature in its first position against the magnetized member pole faces 13. In a electrical relay operable in response to a current flowing through an electrical conductor, the combination comprising, a supporting plate of insulating material formed with a recess for insertion of the electrical conductor, a magnetic circuit including two spaced magnetizable core members secured to and through the supporting plate, biasing windings on the dependent ends of said core members to provide a biasing flux in said circuit when energized, a magnetizable backstrap interconnecting the dependent ends of the core members, pole faces on the upper ends of the core members, magnetized members secured to the upper ends of said core members having portions spaced from said core member pole faces and formed with opposing pole faces, said magnetized members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to its first extreme position against the pole faces of the magnetized members, said armature being moved from its first position to a second position against the core member pole faces when the resultant flux density of the magnetic circuit due to the combined fluxes created by the currents flowing through the bus bar and the biasing windings is of a predetermined level and polarity, the polarities of the magnet sections being such that the saturated keepers form a relatively high reluctance path to flux of the predetermined polarity; the saturated keepers forming a relatively low reluctance path to flux having a polarity opposite to the predetermined polarity, the flux of opposite polarity holding said armature in its first position against the magnetized member pole faces.

14. In an electrical relay operable in response to a current flowing through an electrical conductor, the combination comprising, a supporting plate of insulating material, a magnetic circuit including two spaced magnetizable core members secured to and through the supporting plate, biasing windings on the dependent ends of said core members connectable to one or more energy sources to provide a biasing flux, said electrical conductor passing between the windings on the dependent core member ends, a magnetizable backstrap interconnecting the dependent ends of the core members, pole faces on the upper ends of the core members, magnetized members secured to the upper ends of said core members having portions spaced from said core member pole faces and formed with opposing pole faces, said magnetizable members including permanent magnet sections to provide polarizing fluxes of predetermined polarities, a keeper shunting the poles of the permanent magnet sections, said magnet sections saturating said keepers; and a magnetizable armature pivoted intermediate its ends, the ends of the armature extending into the air gaps between the opposing pole faces of the core members and magnetized members, said magnetic circuit forming a substantially closed loop about the conductor; and resilient means for biasing said armature to a first extreme position against the pole faces of the magnetized members, the operating flux of a first polarity created by a conductor current of predetermined magnitude moving said armature from its first position to a second position against the core member pole faces, said armature being moved to its second position when the resultant flux density of the magnetic circuit due to the combined fluxes created by the currents flowing through the bus bar and the biasing windings is of a predetermined level and polarity, the polarities of the magnet sections being such that the saturated keepers form a relatively high reluctance path to flux of the predetermined polarity; the saturated keepers forming a relatively low reluctance path to flux having a polarity opposite to the predetermined polarity, the flux of opposite polarity holding said armature in its first position against the magnetized member pole faces.

References Cited in the file of this patent

UNITED STATES PATENTS

| | | |
|---|---|---|
| 1,703,353 | Natalis | Feb. 26, 1929 |
| 2,276,535 | Clare | Mar. 17, 1942 |
| 2,735,041 | Wurgler | Feb. 14, 1956 |
| 2,741,728 | Distin | Apr. 10, 1956 |